Patented May 18, 1948

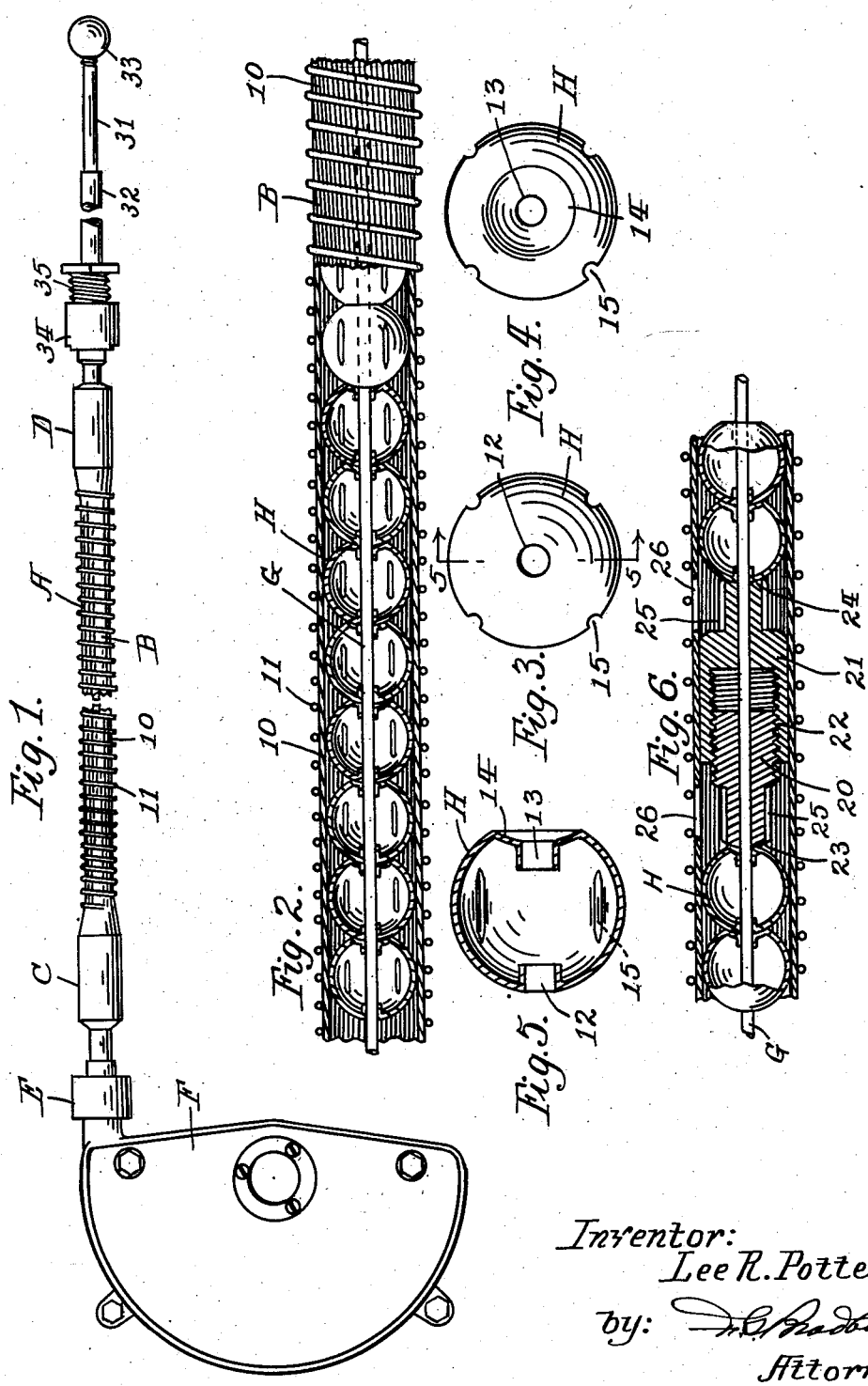

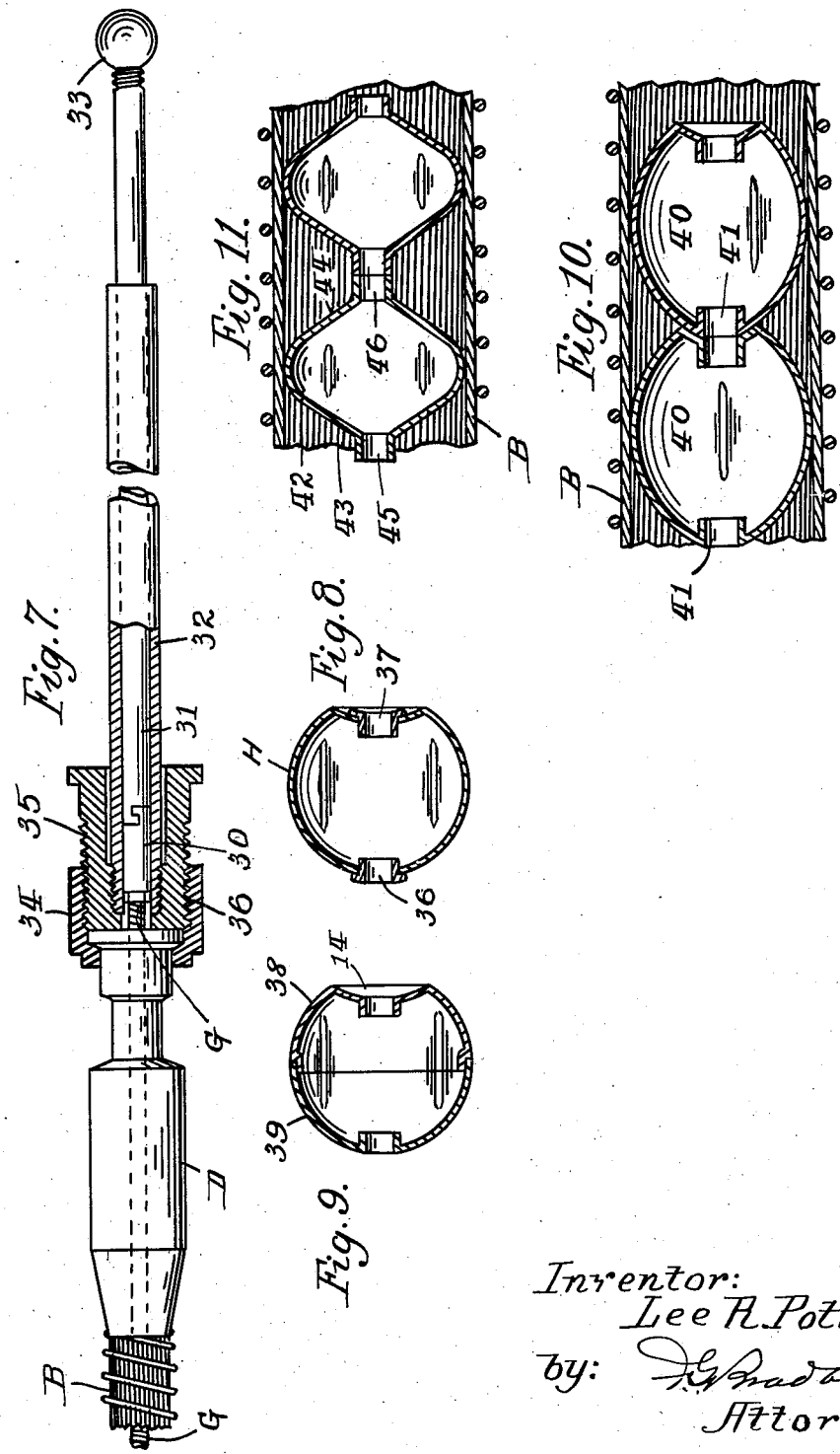

2,441,719

UNITED STATES PATENT OFFICE 2,441,719

MECHANICAL, LINEAL, ROTARY, FLEXIBLE, PUSH-PULL TRANSMISSION DEVICE

Lee R. Potter, Long Beach, Calif., assignor to Southwest Products Co.

Application August 21, 1945, Serial No. 611,840

5 Claims. (Cl. 74—501)

My invention relates to that type of transmission devices which is adapted to freely transmit the lineal reciprocable motion of a flexible shaft around curves for actuating a driven element either axially or revolubly. More particularly it relates to a transmission device having an outer flexible tubular guide casing and a flexible reciprocable shaft therein of either solid or cable type which is slidably supported by a series of freely disposed hollow bearings within said casing. These bearings are so designed as to permit free longitudinal movement of the shaft in the casing as well as free flexing of the casing and shaft, whereby the shaft may perform its function evenly, smoothly and with a minimum of resistance.

An object of the invention is the production of a device of its kind which is light in weight and which permits of gradual or abrupt curves of the shaft when used without binding or reducing the effectiveness of the device.

Another object is the production of a device of its kind by which the resistance of the longitudinal movement of the shaft in its guide casing is reduced to a minimum and its construction permits of effecting application of lubricating medium to its moving parts.

A further object is the production of a device of its kind, the construction of which enables its use for light or heavy work such as the reciprocation or revolution of delicate instruments, gearing or other mechanical movements without sticking or refusing to function and without the application of excessive force.

Among still further objects is the production of a device of its kind which is simple and inexpensive in construction and which readily permits efficient mass production of its parts.

To these ends my invention comprises the features of construction and combination of parts hereinafter described and claimed.

In the drawings forming part of this specification, Fig. 1 is a side elevational view of a transmission device constructed in accordance with my invention and showing it applied to a rotary driven element; Fig. 2 is a partial side elevation on an enlarged scale of a detail portion of my improved transmission device, the major portion of the view being in central longitudinal section; Fig. 3 is an end view on an enlarged scale of one of the hollow bearing elements in which the thrust shaft is slidably supported in the flexible tubular casing; Fig. 4 is a view similar to Fig. 3 looking at the opposite end of the bearing element; Fig. 5 is a longitudinal section of Fig. 3 taken on the line 5—5; Fig. 6 is a longitudinal section of a detail showing adjustable means which may be applied to the series of bearing elements for taking up slack between said bearings to prevent back lash; Fig. 7 is a side elevation, partly in central longitudinal section of a portion of the manually operating portion of my improved transmission device; Fig. 8 is a central longitudinal section of a detail on an enlarged scale showing an alternative construction of the hollow bearing elements, and Figs. 9, 10 and 11 are central longitudinal sections of details on an enlarged scale showing still further alternative constructions of the bearing elements.

Referring particularly to Fig. 1, A represents a flexible transmission device constructed in accordance with my invention, having an outer tubular casing B and cylindrical end applicators C and D. The end applicator C is shown for illustration attached by the fixed coupling E to the housing of a rotary transmission F of usual type, whereby the longitudinal reciprocable movement of a manually operable thrust shaft G (Fig. 2), contained in the flexible casing B is converted into the rotary movement of a driven member. The application of my improved flexible transmission device to a revoluble driven member is only illustrative, it being understood that it may be applied to any lineal or other transmission use when ever desired.

The construction of the flexible guide casing B is of usual type and is composed of an annular series of longitudinal spring wire strands 10 brazed or suitably secured at their end portions to the rigid coupling elements C and D and held bound together by the flexible helical coil of firmly wound spring wire 11. The ends of the binding coil of wire are also suitably anchored by brazing or other suitable means to the coupling elements, the whole forming the usual flexible metallic casing of the transmission. The flexible shaft G extends through this transmission casing and both are freely flexible and capable of functioning when curved or straight. The flexible shaft may be of any suitable type such as solid or resembling a cable.

My improvement provides improved bearing means for flexibly and slidably supporting the reciprocable actuating shaft G in the guide casing so that the shaft may reciprocate freely while the device is shaped about any abrupt or gradual curve or contour. The bearings for the shaft comprise a series of hollow shells H of partial spherical shape, each of which corresponds in outer diameter with the inner diameter of the casing B. These bearings extend in close formation between the inner ends of the coupling elements C and D and resemble thin shells which are formed with inturned coaxially disposed bearings 12 and 13, corresponding in inner diameter with the outer diameter of the shaft G to provide a free reciprocable support for the latter while the shells are freely movable in and supported by the casing to compensate any shape of the latter. Each of the bearing shells is formed on one end with a concave seat 14 in which the convex end surface of the adjacent bearing shell is freely socketed and held as shown in Fig. 2 to permit free flexibility of the casing and of the series of bearings therein. In this manner a freely flexible transmission unit is produced which will not kink and which permits the shaft G to reciprocate freely in any position assumed by the casing.

Each of the bearing shells is formed with one or more longitudinal channels 15 in its surface which are impressed therein and provide by-passages for the free application of lubricating medium between the bearings, casing and shaft.

A slack adjuster may be employed in any suitable position in the train of bearings around shaft G and within the flexible casing B. This slack adjuster is adapted to compensate any looseness and hold or retain the bearing shells in close relationship longitudinally and in free working condition at all times in the casing. It consists of a pair of male and female extensible units 20 and 21 which are threadedly engaged together at 22 and seated by their outer convex and concave ends 23 and 24 against the corresponding ends of the adjacent bearing shells of the series in the casing. The extensible units 20 and 21 are slotted axially at various positions peripherally, such as at 25 to permit a tool such as a screw driver to be inserted for revolving the members of the couple and thus shortening or lengthening the assembly. The casing B is narrowly slotted such as at 26 to permit the insertion of the tool through the wall of the casing to engage the extensible members of the assembly. The slots in the casing may be closed by seal proof covers (not shown). In this manner adjustment can be made without any control disassembly. The female member of the unit, it will be noted, corresponds freely but closely with the inner diameter of the casing B. By the use of this adjusting means any looseness between the members of the train of bearings can be easily compensated to remove any slack and back lash.

The casing B and shaft G are shown provided with manually operable means for reciprocating the shaft in the casing as shown in Fig. 7. The outer end of shaft G is provided with one section 30 of a separable coupling. The other section 31 of said coupling is separably interlocked with section 30 and extends outwardly through a rigidly supported tube 32 in which it reciprocates freely. The outer extremity of member 31 has a ball head or knob 33 by which member 31 can be engaged by the hand of the operator to reciprocate shaft G. The coupling members 30 and 31 are reciprocably held in a sectional support on the outer end portion of the casing terminal member D, the members 34 and 35 of which are threadedly engaged together at 36 so as to be separable. Member 34 is rigidly attached to terminal member D. The tube 32 is threadedly secured in the inner portion of coupling member 35 and acts as a guide for the members 30 and 31 of the coupling. This construction provides a simple and effective means for holding and guiding the manually controlled operating end of the flexible shaft on the outer end of the flexible casing.

The shell bearings employed in the flexible casing may be variously modified within the spirit of my invention, typical examples of which are illustrated in Figs. 8 to 11 inclusive.

In Fig. 8 the lineal bearings 36 and 37 for the shaft G in each of the shells H are constructed as separate units and inserted and brazed in the wall of the shell instead of being formed as an integral part of the shell. This construction is intended to facilitate manufacture when suitable forming apparatus is not available for producing the integral type of construction. In Fig. 9 the spherical shell is formed in two sections 38 and 39 which are suitably joined together, this also being intended to aid manufacture by permitting the parts to be stamped out of material. In Fig. 10 the bearing units 40 are of elliptical shape longitudinally instead of circular and the axial bearings 41 for the shaft G are in the reduced ends of each unit. In Fig. 11 the shaft bearing shells are of more radical shape in which each sell unit is formed with an annular portion 42 which corresponds in diameter with the inner diameter of the casing B and is curved longitudinally to provide a free working contact with the inner surface of the casing so that the casing and shaft may lineally flex freely. The annular portion of the shell unit is abruptly shaped inwardly to provide a pair of inwardly diverging end portions 43 and 44. These end portions terminate inwardly in longitudinally extending axial end bearings 45 and 46 in which the shaft G is adapted to reciprocate freely. These bearing units are assembled in a train with the ends of the shaft bearings of adjacent bearing units freely abutting to permit free flexing and reciprocal movement of the shaft.

In accordance with the patent statutes I have described the principles of operation of my invention together with the construction thereof which I now consider to represent the best embodiment thereof but I desire to have it understood that the structure shown is only illustrative and that the invention can be carried out by other means and applied to uses other than those above set forth within the spirit thereof and the scope of the following claims.

I claim:

1. A lineal actuator, comprising, a longitudinal casing, a flexible shaft extending longitudinally through said casing, and a series of freely articulated bearing shells movably held within said casing, each of said shells having inturned axially disposed end bearings in which said shaft is slidably and flexibly supported.

2. A lineal actuator, comprising a casing, a flexible shaft extending longitudinally through said casing, and a longitudinal series of freely articulated shells movably held within said casing, each of said shells having inturned axially disposed end bearings in which said shaft is slidably supported and the adjacent ends of each pair of shells being freely socketed together to permit free movement therebetween.

3. In a structure as defined in claim 2, the respective shells being of substantial spherical contour.

4. In a structure as defined in claim 2, the respective shells being substantially circular in cross section and of substantial elliptical contour longitudinally.

5. A lineal actuator, comprising a casing, a shaft extending longitudinally through said casing, and a longitudinal series of freely articulated shells movably held within said casing, each of said shells having inturned axially disposed end bearings in which said shaft is slidably supported and each shell having an end concave bearing socket and the companion shell adjacent to each shell having a corresponding convex surface which is rotatively seated in said socket to provide free universal compensating action between each pair of shells.

LEE R. POTTER.

REFERENCES CITED

The following references are of record in the file of this patent:

UNITED STATES PATENTS

| Number | Name | Date |
|---|---|---|
| 1,836,822 | Sneed | Dec. 15, 1931 |
| 1,911,470 | Rosner | May 30, 1933 |
| 1,930,272 | Huck | Oct. 10, 1933 |
| 2,380,015 | Batterson et al. | July 10, 1945 |

FOREIGN PATENTS

| Number | Country | Date |
|---|---|---|
| 702,530 | France | July 19, 1930 |
| 780,557 | France | Jan. 19, 1934 |